(12) United States Patent
Kennedy et al.

(10) Patent No.: US 7,658,878 B2
(45) Date of Patent: Feb. 9, 2010

(54) METHOD OF REINFORCING A STRUCTURE AND A CLAMP

(75) Inventors: Timothy Harold Robert Kennedy, Santa Ana, CA (US); Kenneth John Angus, Newcastle Upon Tyne (GB)

(73) Assignee: Intelligent Engineering (Bahamas) Limited, Nassau (BS)

( * ) Notice: Subject to any disclaimer, the term of this patent is extended or adjusted under 35 U.S.C. 154(b) by 361 days.

(21) Appl. No.: 11/596,013

(22) PCT Filed: May 4, 2005

(86) PCT No.: PCT/GB2005/001714

§ 371 (c)(1),
(2), (4) Date: Nov. 9, 2006

(87) PCT Pub. No.: WO2005/108072

PCT Pub. Date: Nov. 17, 2005

(65) Prior Publication Data

US 2007/0221703 A1  Sep. 27, 2007

(30) Foreign Application Priority Data

May 11, 2004 (GB) ................................. 0410500.3

(51) Int. Cl.
*B29C 45/14* (2006.01)
(52) U.S. Cl. .................. 264/263; 264/275; 228/44.3
(58) Field of Classification Search ............ 264/261, 264/277, 275, 263; 228/44.3
See application file for complete search history.

(56) References Cited

U.S. PATENT DOCUMENTS 4,492,367 A * 1/1985 Cox .................... 269/8
4,745,013 A * 5/1988 Kudert et al. ............ 428/36.7
2002/0195183 A1* 12/2002 Glinz et al. ............... 152/400

FOREIGN PATENT DOCUMENTS

| DE | 195 48 618 C1 | | 8/1997 |
|----|--------------|---|--------|
| DE | 19548618 C1 | * | 8/1997 |
| EP | 0 761 923 A1 | | 3/1997 |
| GB | 2 138 480 A | | 10/1984 |
| GB | 2138480 A | * | 10/1984 |
| GB | 2 366 543 A | | 3/2002 |
| GB | 2366543 A | * | 3/2002 |
| WO | 03/009996 A1 | | 2/2003 |
| WO | 2004/073973 A1 | | 9/2004 |
| WO | WO 2004073973 A1 | * | 9/2004 |

OTHER PUBLICATIONS

International Search Report for PCT/GB2005/001714 mailed Feb. 8, 2005.
GB Search Report of G0410500.3 dated Aug. 18, 2004.

* cited by examiner

*Primary Examiner*—Kat Wyrozebski
*Assistant Examiner*—Robert J Grun
(74) *Attorney, Agent, or Firm*—Nixon & Vanderhye P.C.

(57) ABSTRACT

An existing metal structure can be reinforced by providing a reinforcing metal layer on the metal structure in spaced apart relation to thereby form at least one cavity between inner surfaces of the metal structure and the reinforcing metal layer. An intermediate layer including uncured plastics or polymer material is injected into the cavity, and the plastics or polymer material is cured to adhere to the inner surfaces of the metal structure and the reinforcing metal layer. During the injecting and curing process, the reinforcing metal layer is constrained by at least one restraint member that is held to the existing metal structure by at least one magnetic clamp.

9 Claims, 1 Drawing Sheet

METHOD OF REINFORCING A STRUCTURE AND A CLAMP

This application is the US national phase of international application PCT/GB2005/001714, filed 4 May 2005, which designated the U.S. and claims priority of GB0410500.3, filed 11 May 2004, the entire contents of each of which are hereby incorporated by reference.

The present invention relates to a method of reinforcing and/or reinstating and/or rehabilitating an existing metal structure, particularly existing metal panels of larger existing structures. More particularly, the method relates to reinforcing and/or reinstating metal panels which have been reduced in thickness by corrosion and/or wear in service and which must therefore be replaced or strengthened Structural sandwich plate members are described in U.S. Pat. No. 5,778,813 and U.S. Pat. No. 6,050,208, which documents are hereby incorporated in their entirety by reference, and comprise outer metal, e.g. steel, plates bonded together with an intermediate elastomer core, e.g. of unfoamed polyurethane. These sandwich plate systems may be used in many forms of construction to replace stiffened steel plates, formed steel plates, reinforced concrete or composite steel-concrete structures and greatly simplify the resultant structures, improving strength and structural performance (e.g. stiffness, damping characteristics) while saving weight. Further developments of these structural sandwich plate members are described in WO 01/32414, also incorporated hereby by reference. As described therein, foam forms may be incorporated in the core layer to reduce weight and transverse metal sheer plates may be added to improve stiffness.

According to the teachings of WO 01/32414 the foam forms can be either hollow or solid. Hollow forms generate a greater weight reduction and are therefore advantageous. The forms described in that document are not confined to being made of light weight foam material and can also be made of other materials such as wood or steel boxes.

GB-2,366,543-A discloses a method, referred to as overlay, of reinforcing existing structures so that the reinforced structure effectively incorporates structural sandwich plate members, with a plate or panel of the original structure forming one faceplate of the structural sandwich plate member. In this method, which has been applied to reinforce deck plates of Ro-Ro ferries, flat bars are welded to the existing deck plate and a new top plate welded to the flat bars so that a cavity is formed. As shown in FIG. 1 of the accompanying drawings, the core 14 is then formed by injecting plastics or polymer material which sets and bonds to the existing deck plate 11 and new reinforcing plate 13. This method has considerable advantages over conventional repair techniques which generally involve removing the existing plate and replacing it. In particular, the method of GB-2,366,543-A is much quicker, reducing the time that the existing structure is out of service.

During the injection and curing process, the core material heats up and tends to expand. To prevent this expansion buckling the new top plate, temporary restraint beams 15, as shown in FIG. 2 of the accompanying drawings, are put over the top of the new plate and secured to suitable parts 16 of the surrounding structure. The over-pressure in the core may teach 0.5 barr or more, particularly if the core is thick, and so the restraint beams must be substantial and strongly secured to the surrounding structure. This has been done by welding a T-shaped dog to the surrounding structure and driving wedges between the dog and the bottom flange of the restraint beam. Installation and removal of the dogs is time-consuming and the necessary welding and cutting may damage the surrounding structure.

It is an aim of the present invention to provide an improved method of reinforcing and/or reinstating an existing structure.

According to the present invention, there is provided: a method of reinforcing an existing metal structure comprising the steps of:

providing a reinforcing metal layer on said metal structure in spaced apart relation to thereby form at least one cavity between inner surfaces of said metal structure and said reinforcing metal layer;

injecting an intermediate layer comprised of an uncured plastics or polymer material into said at least one cavity; and curing said plastics or polymer material so that it adheres to said inner surfaces of said metal structure and said reinforcing metal layer, wherein during said injecting and curing steps, said reinforcing metal layer is constrained by at least one restraint member that is held to said existing metal structure by at least one magnetic clamp.

Securing the restraint member(s) or beam(s) using magnetic clamp(s) enables them to be placed much more quickly and reliably than using welded dogs and wedges. Furthermore, the restraint beams can be removed more quickly and no cutting or welding that might damage the existing structure required. An overlay can be effected more quickly, reducing the length of time the structure is out of service and hence the effective cost of the repair.

In a preferred embodiment of the invention, the magnetic clamp is an earth magnet so that it can be quickly locked in place and released by a cam lock mechanism that energises the north-south poles.

The magnetic clamp may comprise a magnet unit to be placed on said existing structure and connected to a bridging member to engage the restraint beam. The magnet unit is preferably attached to a medial part of the bridging member so that the bridging member can bear on two restraint beams, one either side of the magnet unit, and thus fewer clamps are required. Advantageously, the magnet unit is pivotally mounted to the bridging member so that the bridging member can be rotated to engage the restraint beams after the magnet unit has been attached to the existing structure. The bridging member may be a U-shaped member so as to engage a flange of the restraint member, e.g. an I-beam or a C-beam, that is in contact with the reinforcing layer with varying spacing between beams (typically 400-500 mm).

It is also advantageous that the magnet unit is connected to the bridging member via a loading mechanism for advancing or retracting the magnet unit relative to the bridging member. In this way the clamp can be put in place and then the loading mechanism, which may include a threaded bolt engaging a threaded hole in said magnet unit or said bridging member or a cam, is used to clamp the restraint beam in place.

The materials, dimensions and general properties of the reinforcing layer may be chosen as desired for the particular structure to which the invention is to be applied and in general may be as described in U.S. Pat. No. 5,778,813 and U.S. Pat. No. 6,050,208. Steel or stainless steel is commonly used in thicknesses of 0.5 to 20 mm and aluminium may be used where light weight is desirable. Similarly, the plastics or polymer core is preferably compact and may be any suitable material, for example an elastomer such as polyurethane, as described in U.S. Pat. No. 5,778,813 and U.S. Pat. No. 6,050,208.

In general, the overlay process will be as described in International Applications WO02/20341, which document is hereby incorporated in its entirety by reference.

The present invention will be described below with reference to an exemplary embodiment and the accompanying schematic drawings, in which.

In the various drawings, like parts are indicated by like reference numerals.

Figure 1:
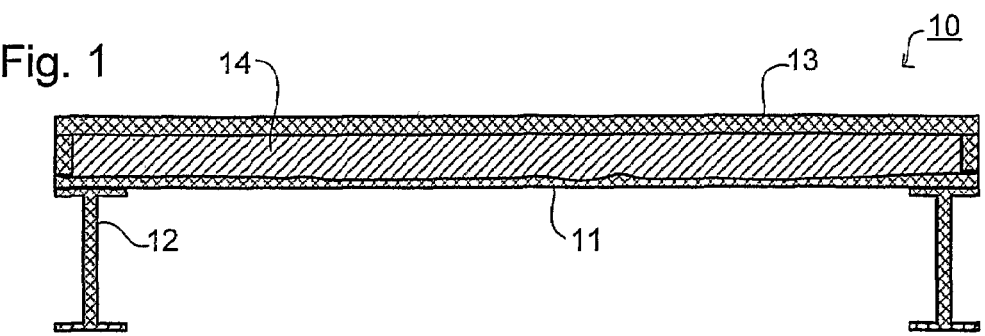
FIG. 1 is a cross-sectional view of a reinforced structure.

FIG. 1 is a cross-sectional view of a deck of a Ro-Ro ferry which has been reinforced by the method according to the present invention. A metal panel 11, forming the original deck, is supported by beams 12 and bulb flats (not shown). Various pipes and cables (not shown) as well as fire insulation material are attached to the underside of metal panel 11.

The metal panel 11 has an original thickness, A, which, in a Ro-Ro ferry deck for example, would be typically in the range of from 10 mm to 20 mm. Typically, corrosion and wear reduce the thickness of the metal panel 11 by approximately 0.15 mm per year. Under these conditions the metal panel 11 would need to be replaced or reinforced after approximately twenty years use.

The method of reinforcing of the present invention involves attaching a reinforcing metal layer 13 to the metal panel 11 of the existing structure. The metal layer 13 is arranged to be in spaced apart relation from the metal panel 11 to thereby form a cavity between the metal panel 11 and the reinforcing metal layer 13. An intermediate core layer 14 of uncured plastics or polymer material, preferably a compact thermosetting material such as polyurethane elastomer is then injected or cast into the cavity. When the plastics or polymer material has cured (it may be a self-curing plastics material which needs no action to be cured or for example a plastics material which requires heating to be cured), it adheres to an inner surface of the metal panel 11 and to an inner surface of the reinforcing metal layer 13 with sufficient strength to transfer shear loads between the metal panel 11 and reinforcing layer 13 so as to form a composite structural member capable of bearing loads significantly greater than self-weight. Generally, all welds are completed prior to injecting the plastics material.

The reinforcing layer may be of steel or aluminum and have a thickness, for example, in the range of from 0.5 to 20 mm. Edge plates may be welded between the original panel 11 and the reinforcing layer 13 to form closed cavity. The core may have a thickness in the range of from 15 to 200 mm; in the present application 50 mm is suitable. The bond strength between the core 13 and face plates 11, 12 should be greater than 3 MPa, preferably 6 MPa, and the modulus of elasticity of the core material should be greater than 200 MPa, preferably greater than 250 MPa, especially if expected to be exposed to high temperatures in use. For low load applications, such as floor panels, where the typical use and occupancy loads are of the order of 1.4 kPa to 7.2 kPa, the bond strength may be lower, e.g. approximately 0.5 MPa. By virtue of the core layer, the reinforced panel has a strength and load bearing capacity of a stiffened steel plate having a substantially greater plate thickness and significant additional stiffening. The panel, of course, need not be flat but may take any form required for its intended use.

To ensure complete filling of the core cavity, the uncured core material must be injected under pressure. The heat generated by the curing process, or applied to effect curing, will further raise the pressure in the core until the core material has fully cured and cooled. The highest pressure reached will depend on the thickness of the core and the properties of the core material but may be of the order of 0.5 barr above atmospheric. Such a pressure will tend to distort the existing panel and reinforcing layer, and additional restraints may be needed to prevent buckling, especially of the reinforcing layer. The existing panel may be adequately supported by existing structures such as support beams 12 and bulb flats.

Figure 2:
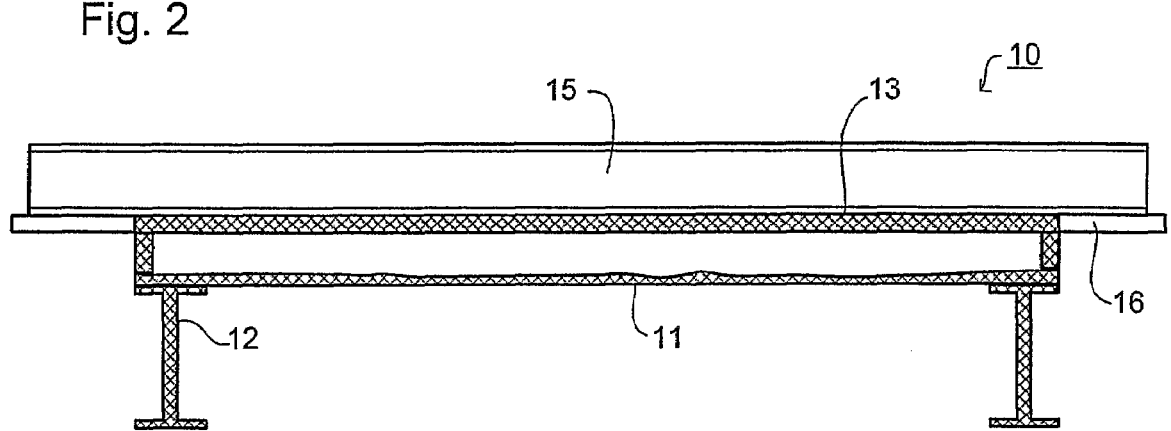
FIG. 2 is a part sectional view of a structure in the process of being reinforced and with temporary restraint beams in place.

As shown in FIG. 2, additional restraint can be provided by restraint beams 15 placed on top of reinforcing layer 13 and secured to the surrounding structure 16. The number, size and placement of restraint beams will depend on the size and shape of the panel being reinforced and the core pressures expected in use. Conventional I-section or C-section steel beams of the appropriate size are suitable.

Figure 3:
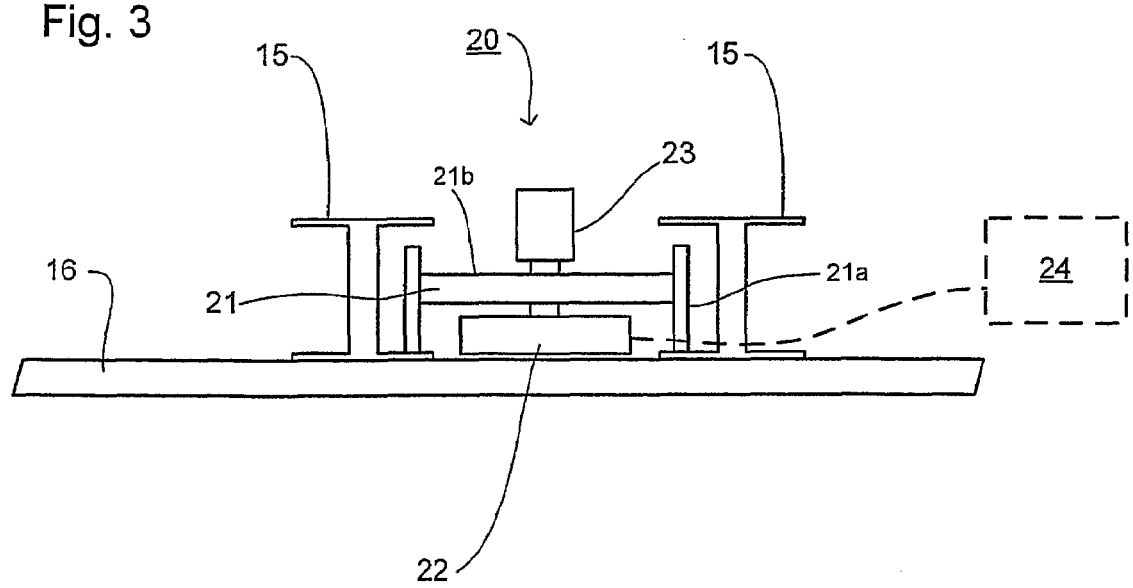
FIG. 3 is a side view of a clamp according to an embodiment of the invention holding two restraint beams.

To hold the restraint beams in placed they must be suitably secured to the surrounding structure 16, this can be done by a magnetic clamp 20 as shown in FIG. 3.

The clamp 20 comprises a bridging member 21 which spans between two restraint beams 15 and a magnet unit 22 which clamps to the existing structure 16. The magnet unit preferably comprises earth (permanent) magnets which are energised by a cam mechanism to clamp to the existing structure 16 and will release when the north-south poles are moved apart. Suitable earth magnets are readily available. Electromagnets, powered by optional power supply 24, may be used instead of permanent magnets if desired.

In this embodiment the magnet unit 22 is rotatably connected to the bridging member 21 via a loading mechanism 23 by which the separation of bridging member and magnet unit 22 can be adjusted. To use the clamp, the loading mechanism is released so that the bridging member is loosely attached to the magnet unit which is then attached to the existing structure 16 by energising the magnets. The bridging member 21 is then rotated to engage the bottom flanges of the restraint beams 15 and the loading mechanism is used to pull the bridging member towards the magnet unit 22, which is attached to the structure 16, thus causing the legs 21a of the bridging member 21 to bear down on the flanges of the restraint beams. The loading mechanism may comprise a threaded shaft rotatably attached but axially fixed to either the magnet unit or the cross bar of the bridging member and engaging a corresponding threaded hole in the other of the magnet unit or the cross bar of the bridging member. A lever or cam mechanism may be used for preloading the magnet to ensure I-beam is flat to the surface of the structure 16.

In case the existing structure is made of aluminium or other non-magnetic material, an iron or steel landing plate for the magnetic clamp to engage may be installed temporarily, or an iron or steel mass placed the other side of an aluminium plate.

It will be appreciated that the above description is not intended to be limiting and that other modifications and variations fall within the scope of the present invention, which is defined by the appended claims.

The invention claimed is:

1. A method of reinforcing an existing metal structure comprising the steps of: providing a reinforcing metal layer on said metal structure in spaced apart relation to thereby form at least one cavity between inner surfaces of said metal structure and said reinforcing metal layer; injecting an intermediate layer comprised of an uncured plastics or polymer material into said at least one cavity; curing said plastics or polymer material so that it adheres to said inner surfaces of said metal structure and said reinforcing metal layer; and during said injection and curing steps constraining said reinforcing metal layer by at least one restraint member and holding said at least one restraint member to said existing metal structure by at least one magnetic clamp; wherein said at least one magnetic clamp is to be placed on said existing structure and connected to a bridging member in a medial position such that said bridging member can bear on two restraint members on either side of the magnet unit.

2. A method according to claim 1 wherein said magnetic clamp comprises an earth magnet.

3. A method according to claim 1 wherein said magnet unit is pivotally mounted to the bridging member so that the bridging member can be rotated to engage the restraint member after the magnet unit has been attached to the existing structure.

4. A method according to claim 1 wherein said bridging member is a U-shaped member so as to engage a flange of the restraint member that is in contact with the reinforcing layer.

5. A method according to claim 1 wherein said magnet unit is connected to the bridging member via a loading mechanism for advancing or retracting the magnet unit relative to the bridging member and said method comprises; placing said magnet unit in contact with said existing structure and then using said loading mechanism to clamp the restraint member in place.

6. A clamp for use to secure a restraint member in a method of reinforcing an existing structure, said clamp comprising a magnet unit to be placed on said existing structure and connected to a bridging member to engage the restraint member, said magnet unit being attached to a medial part of said bridging member so that said bridging member can bear on two restraint members one either side of the magnet unit, wherein said bridging member is a U-shaped member so as to engage a flange of each of the two restraint members in contact with the reinforcing layer.

7. A clamp according to claim 6 wherein said magnet unit is pivotally mounted to the bridging member so that the bridging member can be rotated to engage the restraint member after the magnet unit has been attached to the existing structure.

8. A clamp according to claim 6 wherein said magnet unit is connected to the bridging member via a loading mechanism for advancing or retracting the magnet unit relative to the bridging member whereby said magnet unit can be placed in contact with said existing structure and then said loading mechanism used to clamp the restraint member in place.

9. A method of reinforcing an existing metal structure comprising the steps of: providing a reinforcing metal layer on said metal structure in spaced apart relation to thereby form at least one cavity between inner surfaces of said metal structure and said reinforcing metal layer; injecting an intermediate layer comprised of an uncured plastics or polymer material into said at least one cavity; curing said plastics or polymer material so that it adheres to said inner surfaces of said metal structure and said reinforcing metal layer; during said injection and curing steps constraining said reinforcing metal layer by two restraint members each including at least one flange engaging a surface of said reinforcing metal layer; and interposing a magnetic clamp between said two restraint members and engaging both of said flanges with said magnetic clamp, wherein said magnetic clamp comprises a magnet unit to be placed on the metal structure and connected to a bridging member to engage the two restraint members, and wherein said magnet unit is attached to a medial part of said bridging member so that said bridging member can bear on said two restraint members on either side of the magnet unit.

\* \* \* \* \*